Nov. 11, 1924.  
A. HEINZERLING  
1,514,764  
WOODWORKING MACHINE  
Filed Sept. 26, 1923

Patented Nov. 11, 1924.

1,514,764

UNITED STATES PATENT OFFICE.

AUGUST HEINZERLING, OF DETROIT, MICHIGAN.

WOODWORKING MACHINE.

Application filed September 26, 1923. Serial No. 664,916.

*To all whom it may concern:*

Be it known that I, AUGUST HEINZERLING, a citizen of the German Republic, residing at Detroit, Wayne County, Michigan, have invented certain new and useful Improvements in Woodworking Machines, for which I have filed an application for patent in Germany on the 24th of April, 1922, and of which the following is a specification.

This invention relates to a wood working machine which is constructed in such a manner that it is no longer necessary for the workman to leave his place for removing the work piece from the machine nor to occupy a second workman for this purpose. Owing to the improved construction of the machine the efficiency of the machine is increased and much time and work are economized. A salient feature of the invention is that the work piece after having been finished is automatically conducted towards the workman by means of a conveying device. In order to accelerate the conveying of the finished work piece a counterpressure element may be arranged which is adapted to be released by the work piece. This counter-pressure element has preferably the shape of a trolley.

The invention will be best understood from a consideration of the following detailed description taken in connection with the accompanying drawings forming a part of this specification, with the understanding that while on the drawings one embodiment of the invention is disclosed, the invention is not confined to any strict conformity with the showing of the drawings, but may be embodied in any manner which does not make a material departure from the salient features of the invention.

Figure 1:
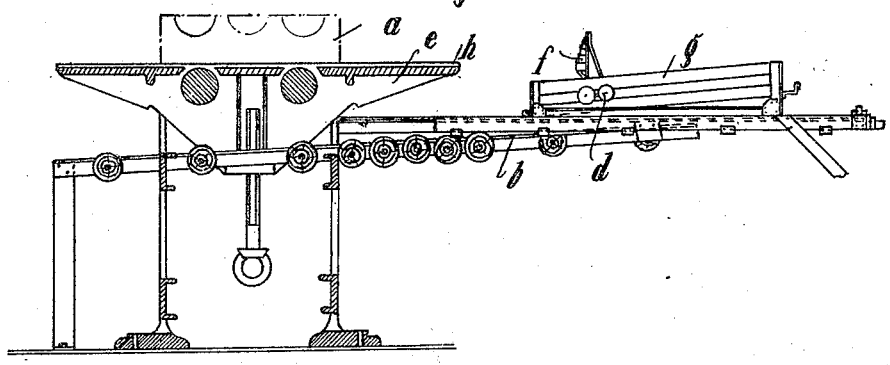
Fig. 1 shows the improved wood working machine in side elevation partly in section.
Figure 2:
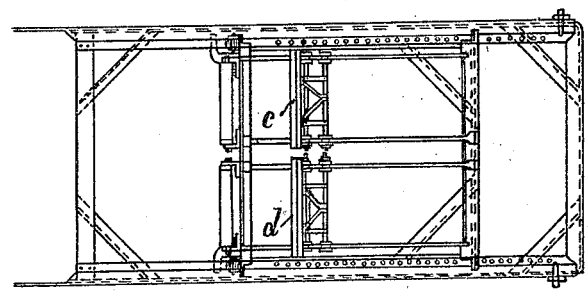
Fig. 2 is a plan view of part of the machine.

The salient feature of the invention is that the work piece after one operation is automatically returned to the workman. With this object in view the work piece when coming out of the machine $a$ drops upon a conveying mechanism $b$ which brings the work piece back to the workman. For accelerating the return of the work piece a counterpressure element may be arranged which is to be released by the workpiece. In the form of construction shown this counterpressure element consists of two trolleys $c, d$.

The work piece is advanced in the usual manner upon the table $e$ and gets, after having advanced for a determined distance, upon the trolley holder $f$. The trolleys being arranged on inclined guides $g$ have the tendency to roll towards the planing machine. This pressure exerted by the trolleys is transmitted on the workpiece at the instant when the work piece has got beyond the edge $h$ of the table so that it drops upon the inclined conveyor $b$ to be conveyed to the point at which the workman stands.

It is indifferent for the character of the invention how the individual parts of the new arrangement are constructed. It is further indifferent which kind of work piece is used and whether instead of two trolleys $c, d$ only one trolley or a greater number of trolleys than two be provided. Other equivalent elements may be substituted for the trolleys.

The main characteristic feature of the invention is that the work piece as soon as it gets on its travel beyond the edge of the table is conveyed back to the workman.

I claim:—

1. A wood working machine comprising a conveying mechanism designed to receive the workpiece when the same drops off the table and to convey the work piece back to the workman, and a counterpressure element adapted to be engaged by the workpiece and designed to accelerate the conveying of said work piece back to the workman.

2. A wood working machine comprising a conveying mechanism designed to receive the work piece when the same drops off the table and to convey the work piece back to the workman, and trolleys arranged behind the table of the machine and adapted to be engaged by the work piece and designed to accelerate the conveying of said work piece back to the workman.

In testimony whereof I affix my signature in presence of two witnesses.

AUGUST HEINZERLING.

Witnesses:
R. A. MACRAE,
JOHN C. LANDEFELD.